(No Model.)

J. NEWTON.
METHOD OF PRODUCING CONTINUOUS STRUCTURES OF PLASTIC MATERIAL.

No. 268,927. Patented Dec. 12, 1882.

Witnesses:

Inventor:

UNITED STATES PATENT OFFICE.

JOHN NEWTON, OF BROOKLYN, NEW YORK.

METHOD OF PRODUCING CONTINUOUS STRUCTURES OF PLASTIC MATERIAL.

SPECIFICATION forming part of Letters Patent No. 268,927, dated December 12, 1882.

Application filed January 21, 1882. (No model.)

*To all whom it may concern:*

Be it known that I, JOHN NEWTON, of the city of Brooklyn, in the county of Kings and State of New York, have invented a new and useful Method of Producing Continuous Structures of Plastic Material, which is fully set forth in the following specification.

This invention consists of a method of producing a continuous pipe or turned structure of plastic material capable of setting and forming artificial stone or its equivalent, a method which protects the material in place while in a green state from the effects of lateral thrust or superincumbent weight of surrounding matter. Ordinary structures of this nature require time for setting and protection from all disturbances—from jarring, from superincumbent weight, &c.—until the material has hardened. In case of underground structures in streets of cities, and wherever the excavations produce interruption of travel and traffic, ordinary methods are objectionable.

By means of my invention a trench can be dug in the streets of a city, a continuous structure be formed and covered, and the pavement reset as rapidly as the structure is produced.

My method consists in the use of an internal and an external sustaining-structure, of wood or other material—the first to produce the interior form required and to retain this form until the material is firmly set, the second to limit the external form laterally and to sustain all superincumbent weight while the process of setting is going on.

This method likewise protects the plastic material from the effects of its own weight during the process of setting. The weight of superincumbent material is not borne by any portion of the plastic structure itself, but is thrown outside the plastic structure, so that no settling or shocks from above may disturb the base on which the structure rests. Wherever it may be thought best to provide means of opening the pipe or tunnel movable sections may be left by means of any durable packing, saturated with thin mastic or other water-proof material, insulating a portion of the structure, and forming a movable section of the form and size desired.

Figure 1:
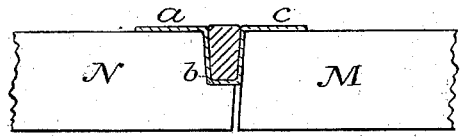
Figure 2:
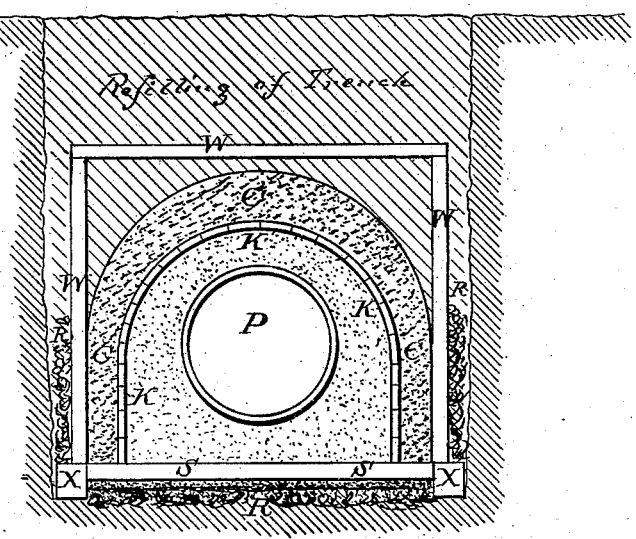

In the accompanying drawings, Figure 1 is a view showing a very secure joint, and Fig. 2 a view in vertical cross-section of a continuous structure with inclosed steam-pipe.

Referring to Fig. 1, an enlargement of the joint is fitted by a continuous sheet of durable water-proof material, *a b c*. The whole may be filled in and painted over with water-proof material, the flaps resting on the upper surface of the blocks N and M being made adherent to and water-tight against them. Two joints will thus be made across the arch, extending to or near to the springing lines, and two longitudinal joints will be formed—one on each side—connecting the extremity of the cross-joints. The longitudinal joints will have a similar sheet of durable water-proof material adhering to the upper and lower faces of the joints, and the flaps will be adherent also to the outside of the beton or other material of the structure and be made water-tight. The longitudinal joints in the beton, &c., will not be enlarged, as indicated in the description of the cross-joints. The four joints thus described—two across the arch and two longitudinal, separating the arch from the upright portion of the structure—will thus form a block, which, although still preventing the percolation of water through the joints, will be removable for purposes of inspection, &c., without the necessity of rupturing the tunnel, and for further convenience in lifting metallic eyebolts may be set in the block. The cross-joints thus formed will be useful in permitting expansion and contraction of the structure due to changes of temperature.

This method of structure is particularly applicable as a protection to underground pipes for conveying steam, hot water, hot air, &c., where it forms a practically water-proof continuous inclosure and receptacle for insulating material to surround the pipes. The presence of this insulating material will prevent concrete while still green from being injured by heat conveyed in the pipes; but fire-clay or pottery-ware may be used as an interior lining, if thought desirable.

C C C, Fig. 2, represent the beton tunnel, resting upon the flat stone S S, with broken stone R R R represented under the bottom and on the sides. The stone S S is represented resting directly upon a thin bed of beton.

W W W represent the framing resting on sill X, to relieve the beton tunnel (before it has fully set) of the load above, and preventing transmission of shocks from passing vehicles, &c.; K K K, center resting upon stone S S, on which center the beton arch is formed. The framing and center are not to be removed.

The tunnel may be used as an inclosure for pipes P, conveying steam, hot air, hot water, &c.; and the insulating material around the pipe is also represented by dots.

The flat bottom of the tunnel may be composed of beton, instead of stone, as represented in the drawings. The bottom of the tunnel, instead of being flat, may be formed as a reverse arch and composed of beton.

The tunnel may be composed of other plastic material capable of setting and forming artificial stone or its equivalent.

While I have here illustrated and described the application of my invention to the covering of a single pipe, I do not limit myself to this, but intend my invention to be applied to cases in which two, three, or any number of pipes desired are to be inclosed.

I also propose to use this construction to produce tunnels or conduit-pipes for conveying water, sewage, &c.

I claim—

1. The method of producing continuous hollow structures underground by placing a sufficient depth of artificial stone or other plastic material capable of setting around a center or interior frame-work in a trench, erecting a protecting frame-work above the said material and filling in the earth above, the said protecting frame-work sustaining the weight of the said earth and shielding the structure from injury while the plastic material is setting, substantially as described.

2. A continuous underground structure, of artificial stone or like material, containing one or more mains or pipes for conveying steam or other hot fluid, substantially as described.

3. An underground structure, of artificial stone or like material, containing one or more mains or pipes for conveying steam or other hot fluid, with the space between said mains or pipes and the interior of said structure filled with non-conducting material, substantially as described.

4. The improvement in making continuous hollow structures of plastic material, consisting in forming removable sections in them in process of manufacture, substantially in the manner and by the means described.

5. A hollow structure, of artificial stone or like material, having removable sections of like material, with the cross and longitudinal joints between the removable sections and the body of the material packed, substantially as described.

6. A continuous hollow structure, of artificial stone or like material, provided at intervals with cross-joints extending partly around the structure, substantially as described.

In testimony whereof I have signed this specification in the presence of two subscribing witnesses.

JOHN NEWTON.

Witnesses:
H. M. MEEKER,
J. M. McINERNY.